US006827778B2

(12) United States Patent
Lummila et al.

(10) Patent No.: US 6,827,778 B2
(45) Date of Patent: Dec. 7, 2004

(54) APPARATUS FOR FEEDING A TREATMENT SUBSTANCE TO AN APPLICATION DEVICE

(75) Inventors: Markku Lummila, Jyväskylä (FI); Erikki Autio, Jyväskylä (FI); Markku Salo, Laukaa (FI)

(73) Assignee: Metso Paper, Inc., Helsinki (FI)

(*) Notice: Subject to any disclaimer, the term of this patent is extended or adjusted under 35 U.S.C. 154(b) by 0 days.

(21) Appl. No.: 10/239,586

(22) PCT Filed: Mar. 22, 2001

(86) PCT No.: PCT/FI01/00288

§ 371 (c)(1),
(2), (4) Date: Oct. 8, 2002

(87) PCT Pub. No.: WO01/72433

PCT Pub. Date: Oct. 4, 2001

(65) Prior Publication Data

US 2003/0136339 A1 Jul. 24, 2003

(51) Int. Cl.[7] ................................................ B60C 12/00
(52) U.S. Cl. ........................ 118/407; 118/410; 118/414
(58) Field of Search ................................ 118/407, 410, 118/414; 427/356, 359

(56) References Cited

U.S. PATENT DOCUMENTS 3,496,012 A * 2/1970 Biorseth ..................... 437/345
5,728,429 A * 3/1998 Berrenberg et al. ......... 427/345

FOREIGN PATENT DOCUMENTS

| | | | |
|---|---|---|---|
| DE | 19700633 | A1 | 7/1998 |
| DE | 19757678 | A1 | 6/1999 |
| EP | 0931878 | A1 | 7/1990 |
| WO | WO 9821408 | A1 | 5/1998 |

* cited by examiner

*Primary Examiner*—Laura Edwards
(74) *Attorney, Agent, or Firm*—Cohen, Pontani, Lieberman & Pavane

(57) ABSTRACT

The invention relates to an arrangement for feeding a treatment substance to an application device used to treat a moving paper or board web, which arrangement includes at least one application chamber (1) extending over the width of the web, to which the treatment substance can be fed. The treatment substance feed devices include at least one elongated feed chamber (3) extending over the width of the application device, to which treatment substance can be fed from the inlet side (8) of the chamber (3), and at least one connection (20) for leading the treatment substance from the feed chamber to the application chamber (1). For feeding the treatment substance between the feed chambers, there is at least one flow route to connect the end (19) of the feed chamber (3) opposite the inlet side (8) and the end of the application device on the side of the inlet side of the first feed chamber (3), through the flow route.

20 Claims, 4 Drawing Sheets

APPARATUS FOR FEEDING A TREATMENT SUBSTANCE TO AN APPLICATION DEVICE

PRIORITY CLAIM

This is a national stage application under 35 U.S.C. §371 of international stage PCT application No. PCT/FI01/00288, filed on Mar. 22, 2001. Priority is claimed under 35 U.S.C. §119(a) and 35 U.S.C. §365(b) from Finnish Patent Application No. 20000698, which was filed in Finland on Mar. 24, 2000, and from which priority was properly claimed in the aforementioned international stage application.

The present invention relates to an arrangement for feeding a coating mixture, size, or other treatment substance to an application device used to treat a moving paper or board web.

In coating or otherwise treating paper or board, the treatment substance is spread either directly onto the moving web or onto an applicator roll through a gap running across the machine or through several nozzles spread over the width of the machine. In short-dwell, jet, or spray coaters, the treatment substance is fed to an application chamber, or to a distribution chamber behind it, through a feed pipe intended to distribute the substance evenly to feed members, which even out the treatment substance and feed it as evenly as possible transversely over the surface of the moving web. Usually, the web is dosed with a considerable excess of treatment substance, compared to the desired final amount of substance, the excess being doctored off the surface of the web or roll after application. A considerable excess of treatment substance is fed to the application chamber, in which the pressure remains more or less constant over the entire width of the device, even though the web and application device may be very wide. Modern application devices usually feed the web with an amount of treatment substance significantly greater than the amount transferred to the web or roll and the pressure in the application chamber is not affected enough to create a pressure difference sufficient to prevent the application device's leveling members or the next ones from giving the end product an even enough coating layer to satisfy customer requirements.

However, the development of treatment devices and increased quality demands from end-product users make greater demands on treatment substance feed methods. Flows in the application chamber must be controlled precisely and all turbulence must be eliminated as far as possible, to ensure, for instance, an even flow of treatment substance from the nozzle gap of a jet coater. Now it is necessary to try to keep the amount of coating as near as possible to the final amount of treatment substance, or even to dose the treatment substance to correspond exactly to the desired final amount of dry solids. This eliminates a return flow of treatment substance from leveling, thus avoiding or substantially reducing drying and dirtying of the treatment substance. An even pressure in the application chamber across the web is easier to maintain if large amounts of treatment substance are fed, but this requires larger feed channels and more powerful pumps to move the treatment substance.

On the other hand, paper grades and manufacturing methods have been developed, in which the paper is given an extremely thin coating layer. In these methods, coating amounts may be 1–5 g/m$^2$, requiring a quite precise profile in the amount of treatment substance applied, as even small variations will cause a large relative variation between the actual and desired amounts of coating. Another problem is devices used to spread size on the web followed by a small amount of coating mixture with a high dry solids content. Film-transfer coaters are examples of such devices. In size and coating application devices without return circulation, for example spray and jet application devices, the feed amounts depend on consumption and are very much smaller than previously. Especially with viscous substances and at low speeds, the feed profile can easily acquire a slope, as the nozzles must be designed to the demands of the highest production speed. Thus, for example, the spray nozzles cannot be given a small enough distribution and size to create an even profile with even the smallest dose, as this would lead to the application chamber filling too slowly, the feed-line pressure increasing, peaks in the feed profile, and a greater danger of blockages in the small nozzles.

Publication WO 98/21408 discloses an arrangement for feeding a coating substance to the application chamber through two feed chambers. In this solution, two feed chambers are connected to the application chamber, each feed chamber being parallel to the application chamber and to the other feed chamber. Both feed chambers are connected to the application chamber through inlet openings, so that the flows from both chambers mix in the application chamber. Each feed chamber has its own treatment substance inlet and exit openings, arranged with the inlet opening of the first feed chamber next to the exit opening of the second feed chamber and vice versa. Thus, there is one inlet opening and one exit opening on each side of the coater and a through flow transverse to the web being coated travels through each feed chamber. In one embodiment, part of the treatment substance leaving the feed chamber can be led to the inlet opening of the adjacent feed chamber, to recirculate the treatment substance.

The arrangement described above can be used to create a more even pressure distribution in the application chamber and to reduce the excess pressure in the chamber, as the even pressure creates an even flow of treatment substance across the web. This solution has the problem of using two feed chambers, to which treatment substance is fed from both sides of the coater. As the use of two feed system and pumps is not economically viable, the treatment substance is fed to the feed chambers along lines from a single pump. Obviously it is then difficult to locate the feed lines and pumping equipment in relation to the manufacturing line. The inlet openings of both feed chambers must have the same pressure, to create an even pressure in the application chamber. Different feed pressures would lead to a danger of the application chamber having a lower pressure on the side with the lower feed pressure, resulting in a drop in the feed amount of treatment substance and a profile error. Thus, the flow resistance in the treatment substance feed piping should be equal in both feed chambers. Equal flow resistances are preferably created by using symmetrical pipe runs, but then the pumping equipment must be placed in the centre of the machine, which is often impossible. Besides, doubled piping becomes complicated and long, increasing equipment costs and the risk of disturbances. A particular problem is that the piping may become dirty, due to the treatment substance drying and particles of it building up in the piping and changing the flow resistance. Of course, this can be avoided by appropriate maintenance and sieving the circulating treatment substance properly.

SUMMARY OF THE INVENTION

The invention is intended to eliminate the defects of the state of the art disclosed above and for this purpose create an entirely new type of solution for feeding an application device with coating substance, size, or other treatment substance.

The invention is based on feeding the treatment substance to the application chamber of at least one application device, from at least one feed chamber with several connections opening to the application chamber and a flow route arranged to the opposite end of the feed chamber to the treatment substance inlet side, to connect the ends of the feed chamber, or a channel for returning at least part of the treatment substance to the end of the treatment substance inlet side of the first feed chamber of the application device.

According to one preferred embodiment of the invention, the return channel is a second feed chamber, connected to the application chamber and set parallel to a first application chamber and connected to a second application chamber, so that the treatment substance circulates from the first application chamber to the second application chamber, excess substance being removed from the second application chamber at the end on the treatment substance inlet side of the application device.

According to another embodiment of the invention, the return channel is a closed pipe, which connects the treatment substance exit side of the feed chamber to the inlet side, to even the pressure in the feed chamber.

More specifically, the arrangement according to the said invention is characterized by what is stated in the characterizing section of claim 1.

Considerable advantages are gained with the aid of the invention.

In the case of film-transfer coaters, which are made for spreading both size and coating mixtures, both the design of the film press and the number of the various alternative constructions in the product family can be reduced. As the invention can be used to give an even transverse application profile over the web independently of the substance to be applied or the feed amount, the same feed beam construction and dimensioning can be used for several machine widths, without having to dimension the feed system specially for each width manufactured. The system's bypass line preferably returns the treatment substance to the inlet side, making the implementation of the treatment substance feed, return, and bypass lines and connections as simple as possible. If doctoring is used to level the treatment substance or if the application uses return circulation, the exit connections of the collector troughs can also be placed on the same side of the machine, so that, if desired, all the coating station's connections can be on the same side of the machine. In jet and spray application devices, two sequential nozzles or rows of nozzles can be used, fed by means of circulation feed piping according to the invention, when the total application amount of the sequential nozzles will remain constant across the web. This solution has the further advantage that, if one nozzle becomes blocked, treatment substance will still be brought to the web, preventing untreated areas forming. As the transfer of the treatment substance to the web can be ensured, doctor or roll damage due to a dry web or applicator roll can be avoided.

BRIEF DESCRIPTION OF THE DRAWINGS

In the following, the invention is examined with the aid of examples and with reference to the accompanying drawings.

DETAILED DESCRIPTION OF THE PRESENTLY PREFERRED EMBODIMENTS

In the following, the terms cross-machine direction and cross direction of the application device refer to a direction transverse to the moving web. Similarly, the width of a device, machine, chamber, or similar refers to any dimension extending in this direction, which is suitable to describe the web width being treated. Due to such things as the implementation of edge seals and the delimitation of the edge, the width being treated is usually slightly less than the total width of the web.

Figure 1:
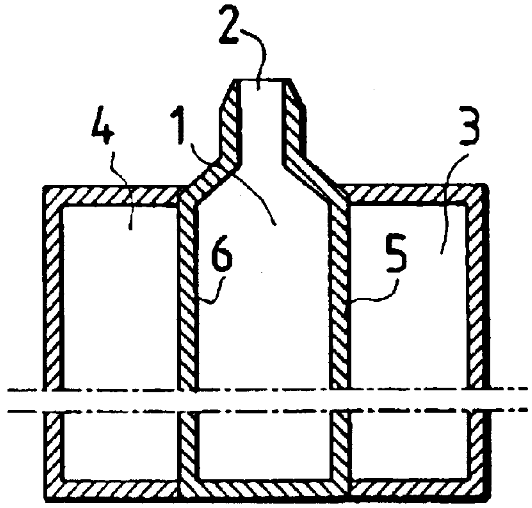
FIG. 1 is a cross-sectional diagram of the principle of construction of one embodiment of the invention.
Figure 2:
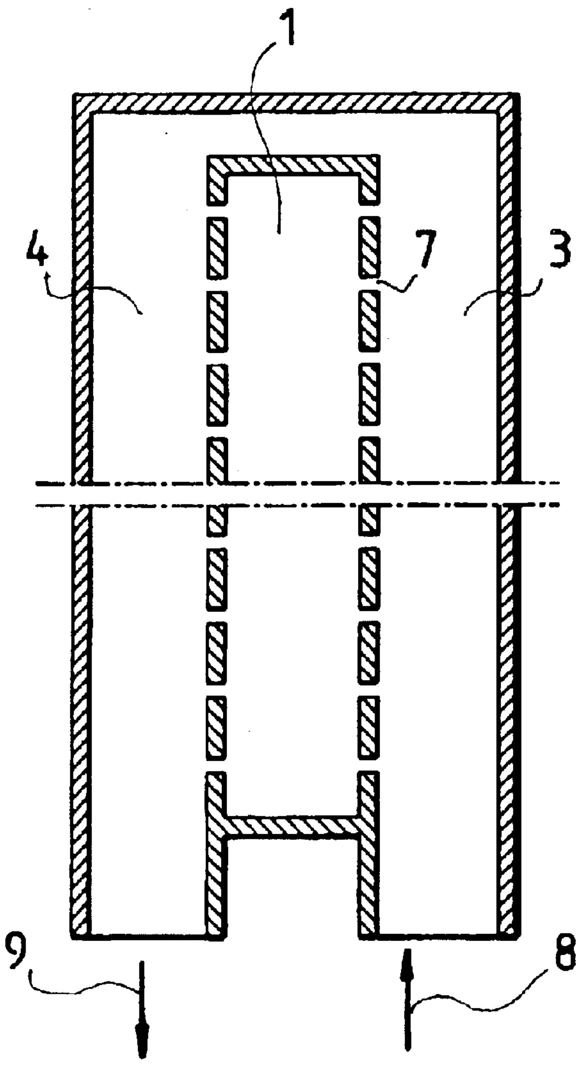
FIG. 2 is a cross-section of FIG. 1, seen from above.

FIGS. 1 and 2 show a greatly simplified jet application device, with a treatment substance feed system according to the invention. An application chamber 1, from which there is a nozzle gap 2, is fitted to the centre of the application beam. The figures are not to scale and lack such items as means for adjusting the nozzle gap. The application chamber has feed chambers 3, 4 on either side, to feed the treatment substance to application chamber 1. There are walls 5, 6, between feed chambers 3 and 4 and application chamber 1, with openings 7, through which the treatment substance travels to application chamber 1. The size of, and distance between openings 7 are arranged to give the most even pressure possible in application chamber 1. As the invention as such can usually be used to keep a sufficiently even pressure in the application chamber, openings 7 can be of equal size and located at equal intervals.

In the embodiment shown in FIGS. 1 and 2, feed chambers 3 and 4 are formed by a U-shaped channel, which can be manufactured by, for example, bending a pipe and making the necessary connections in it to the application chamber, for feeding and removing the treatment substance. The pressure at the start of the channel is greater than that at its exit end due to the known fact that the pressure in a liquid or other flowing substance decreases over the length of pipes, or other flow channels, according to the flow resistance of the channel. If each of the holes of the application chamber 1 over the length of the pipe has the same flow resistance, more treatment substance will flow to application chamber 1 at the start of the flow channel than at the end. Previously, the flow amount has been kept the same by altering the distribution and size of the holes to compensate for this phenomenon. The feed pipe then had to be dimensioned differently for different types of treatment substance and widths of machine. In the solution of FIGS. 1 and 2, two flows of treatment substance enter application chamber 1 from both sides of chamber 1, at the same point in the width of the machine. These flows together form the total amount of treatment substance entering application chamber 1. As in this case feed chambers 3 and 4 are formed from a single unified channel, the pressure in the channel drops from inlet side 8 to exit side 9. Therefore the volume flow entering application chamber 1 at the start of the first feed chamber 3 is greatest while correspondingly that from the exit end of the second feed chamber 4 is least. Similarly, moving forwards along the first feed chamber the volume flow decreases while the volume flow of the counter flow increases in the same direction along the second application chamber. Thus, the total flow volume entering the application chamber remains exactly the same over the entire length of the application chamber. This ensures an even transverse treatment profile of the coating machine and the web, the evenness of the profile being unaffected by changes in the treatment substance or in the volume of substance applied. Thus, the same feed pipe construction can be used in a manner according to the invention for, among other things, size and high-viscosity coating substances. The evenness of the profile is further increased by feed chambers 3, 4 being connected to each other through the application chamber, thus equalizing the pressure in all the chambers.

Figure 3:
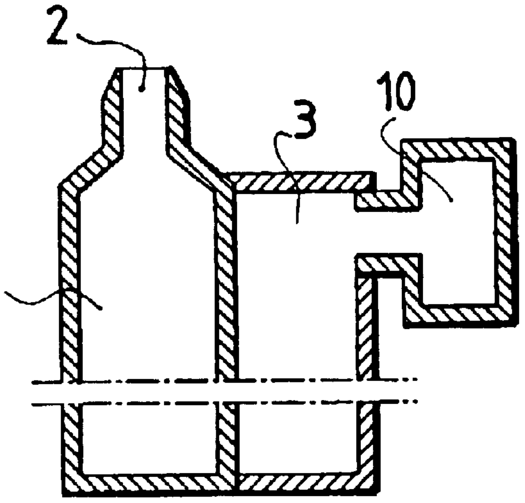
FIG. 3 is a cross-sectional diagram of the principle of construction of one other embodiment of the invention.
Figure 4:
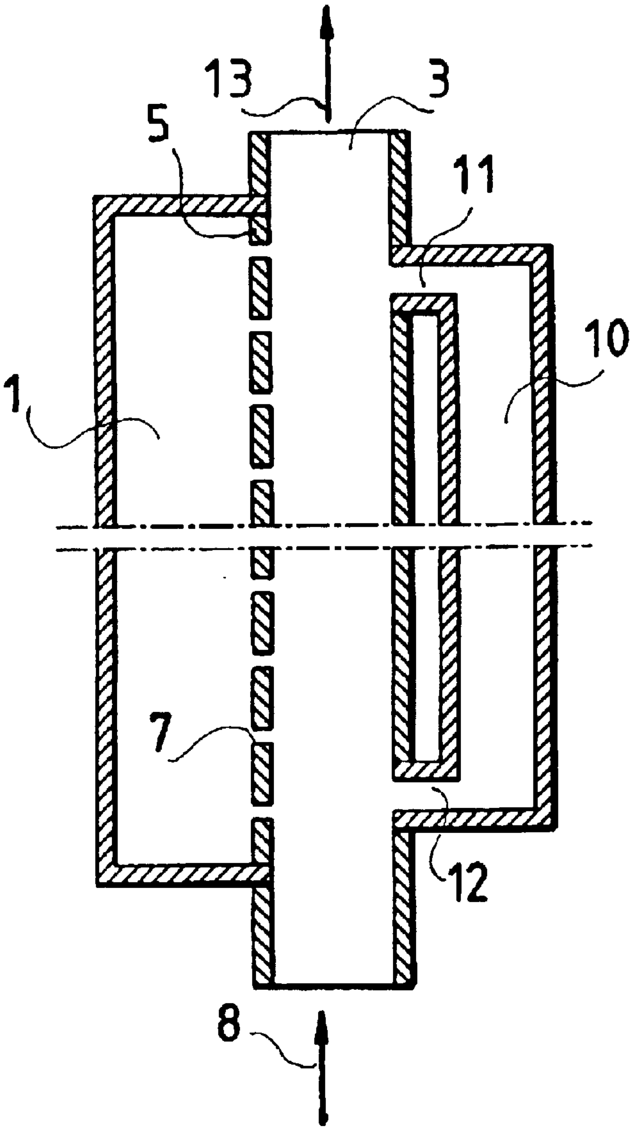
FIG. 4 is a cross-section of FIG. 3, seen from above.

FIGS. 3 and 4 show another embodiment, based on a single feed chamber 3, in which a pressure equalization pipe 10 is used to even the pressure. Pressure equalization pipe 10 links the ends of the feed chamber 3, which have different pressures, through openings 11, 12, equalizing the pressure and creating flows of equal size to application chamber 1 from holes 7 in wall 5. Such an equalization system will not necessarily give as even an application profile as the arrangement of FIG. 1, but in any case it will substantially improve the profile.

Figure 5:
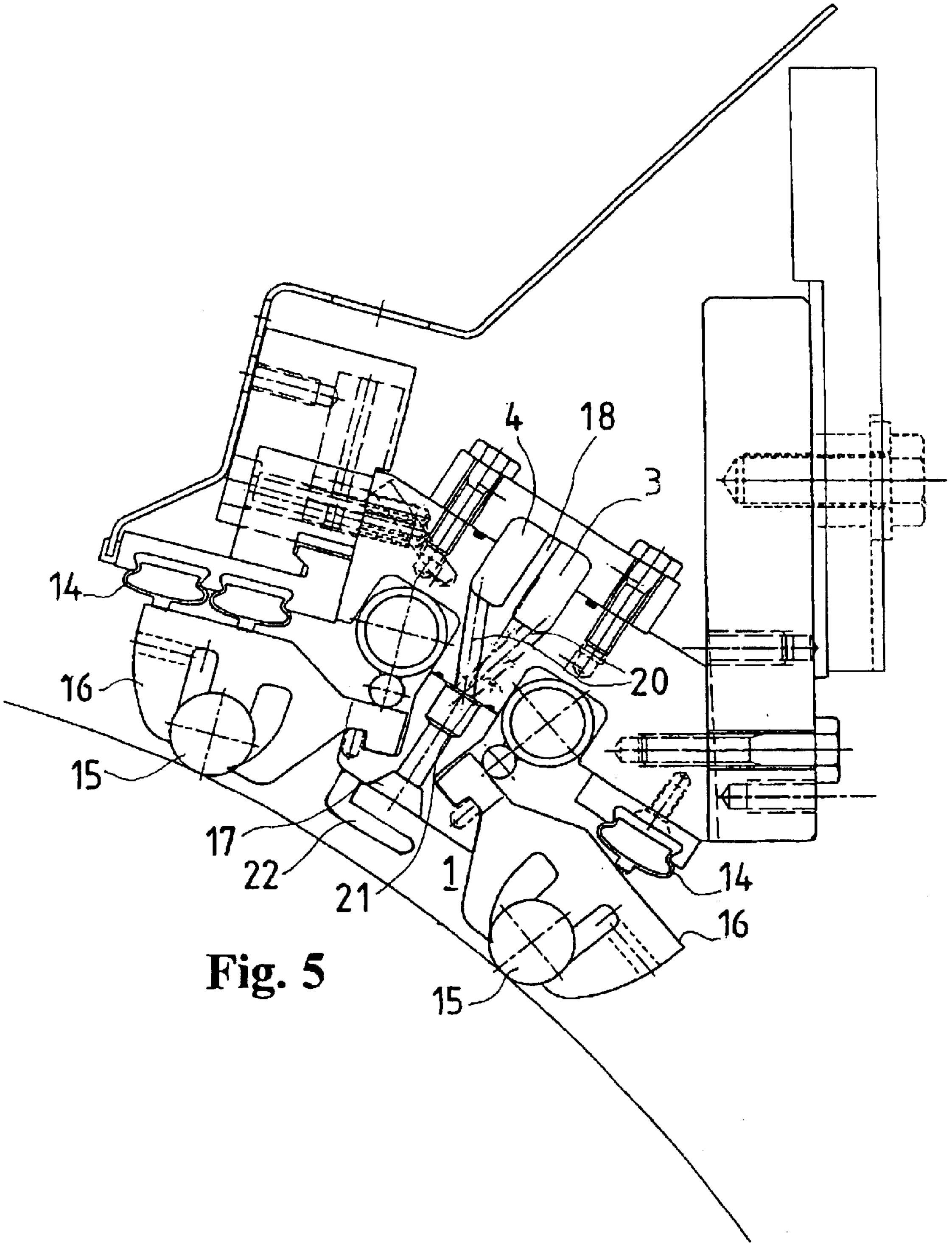
FIG. 5 shows the arrangement according to the invention, applied in connection with a film-transfer coater.
Figure 6:
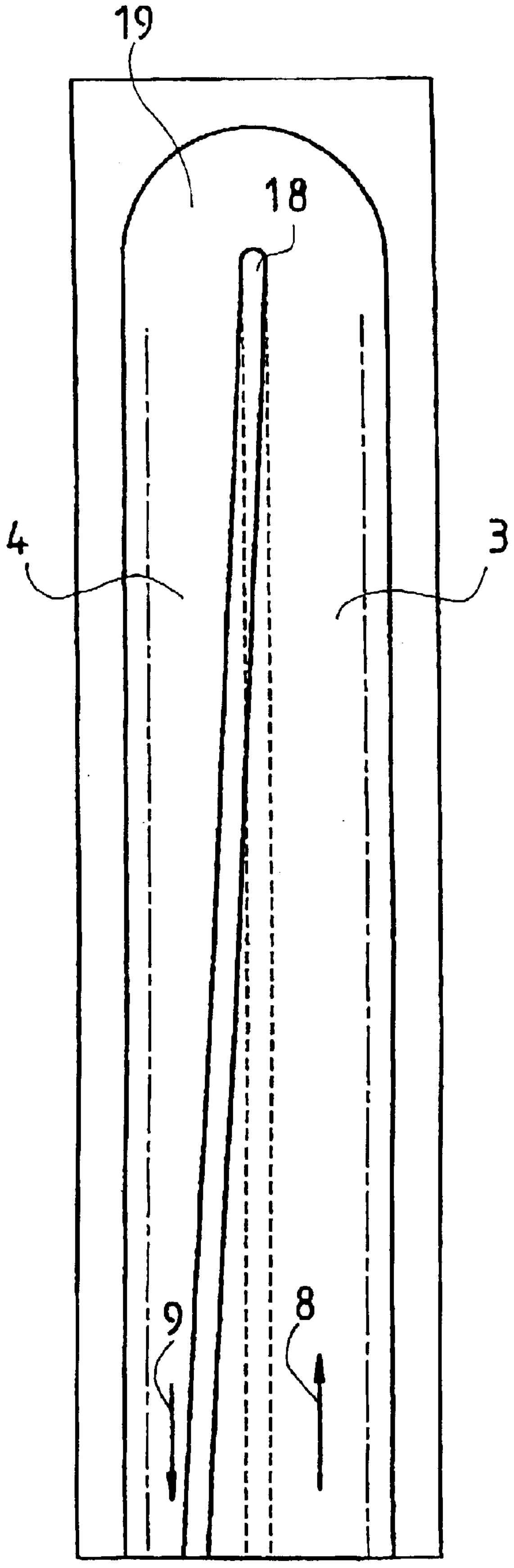
FIG. 6 is a detail of FIG. 5.

FIGS. 5 and 6 show one embodiment of the invention in greater detail. The application device shown is used in a film-transfer coater to spread the layer of treatment substance to be put on the web onto the surface of a rotating applicator roll 13. Roll 13 transfers the coating film onto the web surface being treated. Application chamber 1 is confined in the direction of movement of roll 13 by doctor rods or rolls 15, which are arranged to rotate in cradles 16. Pressure hoses 14 support the doctor rolls 15 and their cradles 16 on the frame of the device. Treatment substance is fed to the application chamber through nozzles 17. Several nozzles are fitted over the width of the machine, with treatment substance fed to them through an arrangement according to the invention. In this embodiment, feed chambers 3, 4 are set parallel to the longitudinal axis of nozzles 17, on the opposite side of them to the applicator roll. Feed chambers 3, 4 form a U-shaped flow route, divided into two separate chamber or channel sections by a partition 18. Partition 18 is set at an angle between feed chambers 3, 4, so that the cross-section of the chambers changes over the entire length of the pair of chambers. The pair of chambers is widest at the treatment substance feed point, i.e. at the inlet end 8 of feed chamber 3. As the distance along the first feed chamber 3 increases, its width decreases, until, at the opposite side of the machine, partition 18 ends. Here, the feed chambers form a curve 19, connecting the end of first feed chamber 3 to the start of second feed chamber 4. Curve 19 runs around the end of partition 18. At the end of partition 18, the end of first chamber 3 and the start of second chamber 4 have cross-sections of equal size, after which the cross-section of second chamber 4 decreases as rapidly as the cross-section of the parallel first chamber 3 increases, when moving in the same direction. Thus, the total cross-sectional area of any common cross-section of chambers 3, 4 is always constant. As treatment substance continuously leaves the pair of feed chambers over their length, the chambers are kept full of treatment substance without unreasonably increasing the pressure difference at the ends of the chambers, while the total flow amount also remains constant over the direction transverse to the direction of movement of the machine's web.

If it is wished to further even the pressure in the feed chambers, small equalization holes can be made in the partition, allowing the treatment substance to flow from the side with greater pressure to that with less pressure. Some means of pressure control, such as a pump or valve, or both can be placed in the curve or other connection joining the feed chambers. These can be adjusted to regulate the pressure difference between the chambers and possibly even influence the coating profile. A valve can be used in special cases, in which the application chamber is flushed, possibly even continuously, by feeding treatment substance from the first feed chamber to the application chamber and returning the excess to the second feed chamber. A pump, on the other hand, can be used to raise reduced pressure in the first feed chamber to equal that in the inlet side of the first chamber, when the operation will nearly correspond to a case using two parallel feed chambers equipped with separate feeds.

From feed channels 3, 4, treatment substance is led along connections 20 to nozzles 17. Each nozzle 17 is connected alternately to one or other of the separate feed channels over the width of the application chamber. Each nozzle 17 can also have a connection 20 from both feed chambers 3, 4, giving an even feed already at the nozzle. Of course, each nozzle can be fed with treatment substance through a separate sieve, or an equalization chamber can be placed before the nozzles over the width of the machine. A sieve 21 is placed between the connections 20 and nozzles 17, to keep coagulated treatment substance and other solid impurities out of the application chamber. The location of sieve 21 in the device can vary, but it is preferably located as close as possible to the application chamber, and in any case in the part of the treatment substance's flow route lying between the inlet side of the first feed chamber and the application chamber. If desired, the sieve and connections can be dimensioned to affect the pressure difference between the treatment substance feed point and the application chamber. A baffle plate 22 is located in application chamber 1, in front of nozzles 17. The flow of treatment substance from nozzles 17 strikes the baffle plate and spreads the treatment substance evenly between the nozzles too, over the entire coating width. The baffle plate is usually a solid plate, but it can also be envisaged as being toothed, for example, with the teeth occurring next to the nozzles. Toothing mainly corresponds using a baffle plate with separate nozzles. Though a toothed plate can give better nozzle cleaning, it has a poorer spreading effect than a solid plate. The distance of the baffle plate from the nozzles can be adjustable and its shape can vary.

Solutions differing from the embodiments disclosed above can also be envisaged within the scope of the invention. The feed chamber system flow routes are most easily made by being bent from a pipe of even thickness, if a pipe with a changing cross-sectional area is not required, such a pipe being attachable mechanically to the application device. Another simple alternative is to place a partition or partitions in a conventional feed chamber, thus dividing the chamber in a manner according to the invention. If the invention is used in an entirely new structure, the channels and the rest of the structure can be designed very freely. In the embodiment of FIG. 6, for example, the location of the partition can be moveable, permitting adjustment of the feed profile to allow for velocity, treatment substance, and other variables. Several application chambers can also be envisaged, as can several feed chambers. An equalization chamber, which further evens the pressure and flow to make them uniform, can be fitted between the connections from the application chamber and the feed chamber. Especially in cases in which the application chamber is arranged directly against the moving web, the doctor members confining the chamber may detach fibres from the web surface. Other particles can also collect in the chamber and, if they come between the web and doctor member in particular, will cause streaks and other faults in the treatment substance layer. This can be prevented by fitting throttle nozzles to the application chamber to remove the treatment substance from the chamber, thus creating a flushing flow in the application chamber. The treatment substance used for flushing can be returned to the treatment substance circulation, where the sieves in the circulation will remove impurities in it. A flushing flow will make it easier to control the feed amount and pressure and the application chamber faster to empty when operation is shut down. The flushing or throttle nozzles can be located as desired in the application chamber, but it is preferable to place the nozzles on the opposite side of the baffle plate to the feed nozzles, thus making the treatment substance circulate in the application chamber.

What is claimed is:

1. An apparatus for feeding a treatment substance to an application device used to treat a moving paper or board web, comprising:

an application chamber extending substantially over a width of the web to which the treatment substance can be fed;

an elongated feed chamber extending substantially over a width of the application device, to which treatment substance can be fed from at least one inlet at an inlet end of the chamber; and a connection for leading the treatment substance from the feed chamber to the application chamber;

wherein, within the feed chamber, there is a flow route connecting an exit end of the feed chamber to the inlet end of the feed chamber, the exit end of the feed chamber having at least one exit and being positioned at an opposite end of the feed chamber relative to the inlet end of the feed chamber with respect to a flow direction of the treating substance in the feed chamber;

wherein all of the at least one inlet are positioned on the same transverse side of the web and all of the at least one exit are positioned on the same transverse side of the web; and wherein the direction of said flow route is substantially transverse to the direction of movement of the moving web.

2. The apparatus of claim 1, wherein said feed chamber comprises:

a first feed chamber; and a second feed chamber;

wherein the second feed chamber is positioned parallel to the first feed chamber;

wherein the first and second feed chambers are connected to the application chamber such that the treatment substance can be fed from the first and second feed chambers to the application chamber, the inlet end being positioned at one end of the first feed chamber, the exit end being positioned at one end of the second feed chamber;

wherein the first and second feed chambers are connected to one another such that the treatment substance can be fed from the first feed chamber to the second feed chamber;

wherein the inlet end and the exit end are located on a first transverse side of the web, said first transverse side of the web being on the opposite side from a second transverse side of the web; and wherein the first and second feed chambers are connected to one another at the second transverse side of the web.

3. The apparatus of claim 1, further comprising:

a pipe which connects a first end to a second end of the feed chamber in order to equalize the pressure in the feed chamber, wherein the first end of the feed chamber is where the at least one inlet end is located and the second end of the feed chamber is where the exit end is located.

4. The apparatus of claim 2, wherein the first and second feed chambers have constant cross-sectional areas over their entire length.

5. The apparatus of claim 2, wherein the cross-sectional areas of the first and second feed chambers vary over their length so that the cross-sectional area decreases from the inlet end of the first feed chamber to the exit end of the second feed chamber.

6. The apparatus of claim 5, wherein a total cross-sectional area of the first and second feed chambers is constant along a length of the first and second feed chambers.

7. The apparatus of claim 1, further comprising:

a pressure equalization chamber positioned between the application chamber and the connection from the feed chamber.

8. The apparatus of claim 1, further comprising:

a sieve positioned in a flow route of the treatment substance from the feed chamber to the application chamber.

9. The apparatus of claim 2, further comprising:

a sieve positioned in a flow route of the treatment substance from the feed chamber to the application chamber.

10. The apparatus of claim 5, further comprising:

a sieve positioned in a flow route of the treatment substance from the feed chamber to the application chamber.

11. The apparatus of claim 6, further comprising:

a sieve positioned in a flow route of the treatment substance from the feed chamber to the application chamber.

12. The apparatus of claim 2, further comprising:

a means for controlling pressure of the treatment substance feeding from the first feed chamber to the second feed chamber.

13. The apparatus of claim 12, wherein the means for controlling pressure comprises a pump or valve.

14. The apparatus of claim 1, further comprising:

a throttle nozzle fitted to the application chamber to remove the treatment substance from the application chamber and to create a flushing flow in the application chamber.

15. The apparatus of claim 2, further comprising:

a throttle nozzle fitted to the application chamber to remove the treatment substance from the application chamber and to create a flushing flow in the application chamber.

16. The apparatus of claim 1, further comprising:

a nozzle connected to the application chamber so that the treatment substance can flow from the application chamber to and out of the nozzle, and further comprising a baffle plate positioned in front of the nozzle so that flow of the treatment substance out of the nozzle strikes the baffle plate.

17. The apparatus of claim 2, further comprising:

a nozzle connected to the application chamber so that the treatment substance can flow from the application chamber to and out of the nozzle, and further comprising a baffle plate positioned in front of the nozzle so that flow of the treatment substance out of the nozzle strikes the baffle plate.

18. The apparatus of claim 1, wherein the at least one inlet end and the at least exit end are on opposite transverse sides of the web.

19. The apparatus of claim 1, wherein the at least one inlet end and the at least exit end are on the same transverse side of the web.

20. An apparatus for feeding a treatment substance to an application device used to treat a moving paper or board web, comprising:

an application chamber extending substantially over a width of the web;

an elongated feed chamber extending substantially over a width of the application device, for delivering said treatment substance to said application chamber, said feed chamber comprising:

a first feed sub-chamber comprising at least one inlet for receiving treatment substance into the feed chamber, wherein the treatment substance flows through said first feed sub-chamber in a first direction substantially transverse to the direction of the moving web;

a transfer area for receiving the treatment substance from the first feed sub-chamber; and a second feed sub-chamber comprising at least one exit for discharging the treatment substance out of the feed chamber, wherein the treatment substance flows from the transfer area into and through the second feed sub-chamber in a second direction substantially transverse to the direction of the moving web;

wherein both the first and second feed chambers feed the application chamber and the first and second directions of flow are in opposite directions; and wherein the at least one inlet and the at least one exit are located on a first transverse side of the web and the transfer area is located toward a second transverse side of the web opposite from the first.

* * * * *

UNITED STATES PATENT AND TRADEMARK OFFICE

CERTIFICATE OF CORRECTION

PATENT NO. : 6,827,778 B2 
DATED : December 7, 2004
INVENTOR(S) : Markku Lummila It is certified that error appears in the above-identified patent and that said Letters Patent is hereby corrected as shown below:

Title page,
Item [75], should read:
-- Inventors: Markku Lummila, Jyväskylä (FI);
Erkki Autio, Jyväskylä (FI); Markku Salo, Laukaa (FI) --.

Signed and Sealed this

Twenty-third Day of August, 2005

JON W. DUDAS
*Director of the United States Patent and Trademark Office*